(12) United States Patent
Heemskerk et al.

(10) Patent No.: US 7,167,438 B2
(45) Date of Patent: Jan. 23, 2007

(54) OPTICAL DISC WITH DIFFERENT WOBBLE PATTERNS IN DIFFERENT GROOVES

(75) Inventors: Jacobus Petrus Josephus Heemskerk, Eindhoven (NL); Cornelis Marinus Schep, Eindhoven (NL); Aalbert Stek, Eindhoven (NL); Shigeru Furumiya, Hyogo (JP); Hiromichi Ishibashi, Osaka (JP); Junichi Minamino, Nara (JP); Hiroshi Ogawa, Tokyo (JP); Shin Masuhara, Tokyo (JP); Tatsushi Sano, Tokyo (JP)

(73) Assignees: Matsushita Electric Industrial Co., Ltd., Osaka (JP); Koninklijke Philips Electronics N.V., Eindhoven (NL); Sony Corporation, Tokyo (JP)

( * ) Notice: Subject to any disclaimer, the term of this patent is extended or adjusted under 35 U.S.C. 154(b) by 295 days.

(21) Appl. No.: 10/490,335

(22) PCT Filed: Oct. 16, 2002

(86) PCT No.: PCT/JP02/10721

§ 371 (c)(1),
(2), (4) Date: Oct. 1, 2004

(87) PCT Pub. No.: WO03/034415

PCT Pub. Date: Apr. 24, 2003

(65) Prior Publication Data

US 2005/0058056 A1    Mar. 17, 2005

(30) Foreign Application Priority Data

Oct. 16, 2001  (JP)  .............................. 2001-318381

(51) Int. Cl.
*G11B 7/24*  (2006.01)
(52) U.S. Cl. .................. 369/275.4; 369/275.3
(58) Field of Classification Search ............. 369/275.4, 369/275.3, 275.1, 44.13, 53.34, 47.21, 59.19, 369/47.31, 53.2, 47.28
See application file for complete search history.

(56) References Cited

U.S. PATENT DOCUMENTS

| 6,577,590 B1 * | 6/2003 | Minamino et al. ....... 369/275.3 |
| 6,580,680 B1 | 6/2003 | Van Den Enden et al. |
| 6,757,239 B1 * | 6/2004 | Minamino et al. ....... 369/275.4 |
| 7,027,374 B1 * | 4/2006 | Minamino et al. ....... 369/53.34 |

FOREIGN PATENT DOCUMENTS

| EP | 0 939 398 | 9/1999 |
| HU | P0100086 | 5/2001 |
| JP | 07 014173 | 1/1995 |
| JP | 2000 137930 | 5/2000 |

OTHER PUBLICATIONS

Minamino et al., "Practical Study of Saw-Tooth Wobble Addressing by Theoretical and Experimental Approaches", Japanese Journal of Applied Physics, vol. 41, No. 3B, Nov. 2001, XP-002219543, pp. 1741-1742.

* cited by examiner

*Primary Examiner*—Ali Neyzari
(74) *Attorney, Agent, or Firm*—Wenderoth, Lind & Ponack, L.L.P.

(57) ABSTRACT

The S/N ratio is improved for recording data to grooves (2-1, 2-2) of an optical disc so that as much information as possible can be recorded at the lowest possible frequency band. An optical disc using wobble patterns to record different information has a first groove (2-1) having a first wobble pattern (22) in which one wobble period has a sharp rising edge and a gradual falling edge; and a second groove (2-2) having a second wobble pattern (24) in which one wobble period has a gradual rising edge and a sharp falling edge. Each of the first and the second wobble pattern is represented by a first fundamental and a second harmonic of a Fourier series. The polarity of the second harmonic, which is an even harmonic, of the second wobble pattern is opposite that of the first wobble pattern. A method for manufacturing this optical disc is also provided.

11 Claims, 13 Drawing Sheets

*Fig.3A*

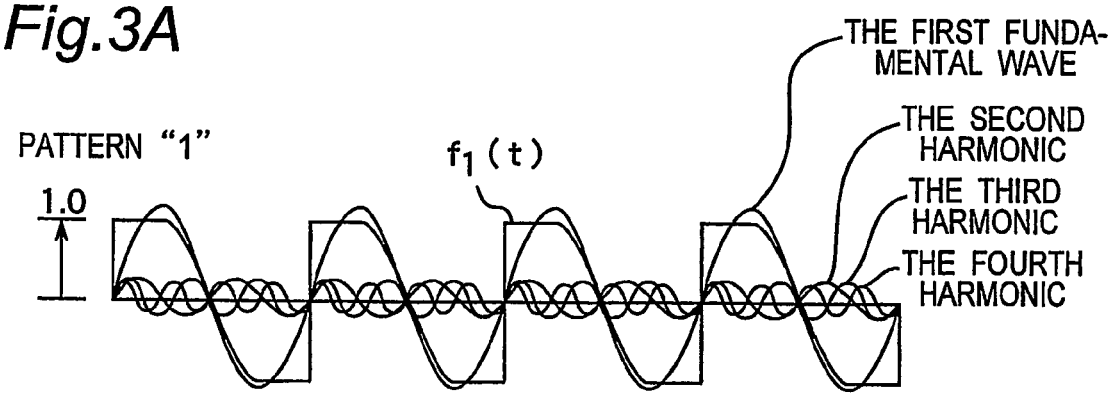

$$f_1(t) = \left(\frac{1}{2} + \frac{2}{\pi}\right)\sin(\omega_0 t) + \sum_{n=2}^{\infty}\left\{\frac{2}{n\pi} - \frac{2}{n\pi(1-n^2)}\cos\left(\frac{n}{2}\pi\right)\right\}\sin(n\omega_0 t)$$

$$= H_1 \sin(\omega_0 t) + \sum_{n=2}^{\infty} H_n \sin(n\omega_0 t)$$

$$\begin{pmatrix} H_1 = 1.137, & H_2 = 0.212 \\ H_3 = 0.212, & H_4 = 0.170 \end{pmatrix}$$

*Fig.3B*

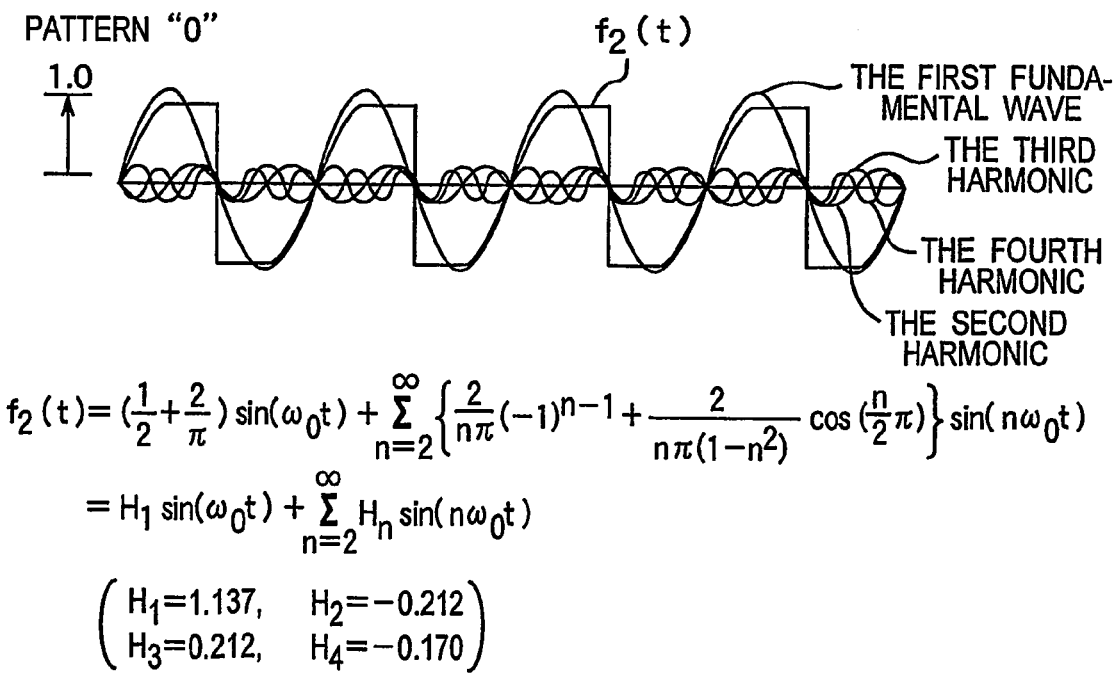

$$f_2(t) = \left(\frac{1}{2} + \frac{2}{\pi}\right)\sin(\omega_0 t) + \sum_{n=2}^{\infty}\left\{\frac{2}{n\pi}(-1)^{n-1} + \frac{2}{n\pi(1-n^2)}\cos\left(\frac{n}{2}\pi\right)\right\}\sin(n\omega_0 t)$$

$$= H_1 \sin(\omega_0 t) + \sum_{n=2}^{\infty} H_n \sin(n\omega_0 t)$$

$$\begin{pmatrix} H_1 = 1.137, & H_2 = -0.212 \\ H_3 = 0.212, & H_4 = -0.170 \end{pmatrix}$$

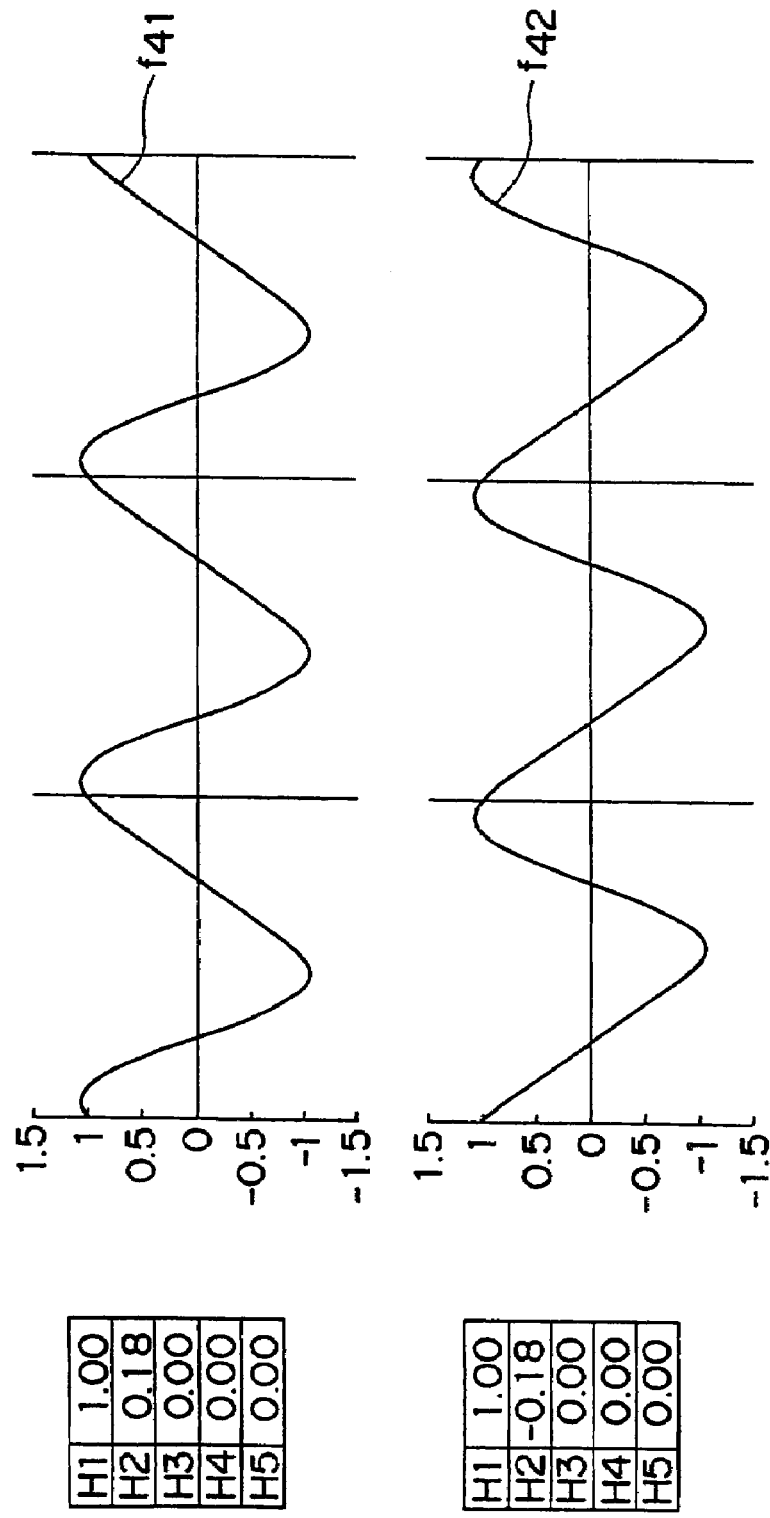

Fig. 12

| WOBBLE NO. | 0 | 1 | 2 | 3 | 4 | ... | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | ... | 52 | 53 | 54 | 55 |
|---|---|---|---|---|---|---|---|---|---|---|---|---|---|---|---|---|---|---|---|---|---|---|---|---|---|---|---|---|---|---|---|---|---|---|---|---|---|---|
| SUB BLOCK NO. | | | | | | | | | | | | | | | | | | | | | | | | | | | | | | | | | | | | | | |
| 0 MONO | a | b | c | | | ... | | | | | | | | | | | | | | | | | | | | | | | | | | | | ... | | | | |
| 1 SYNC | a | b | c | | | ... | | | | | | | | | | | | | | | | | | | | | | | | | | | | ... | | | | |
| 2 MONO | a | b | c | | | ... | | | | | | | | | | | | | | | | | | | | | | | | | | | | ... | | | | |
| 3 SYNC | a | b | c | | | ... | | | | | | | | | | | | | | | | | | | | | | | | | | | | ... | | | | |
| ... | ... | ... | ... | | | ... | | | | | | | | | | | | | | | | | | | | | | | | | | | | ... | | | | |
| 6 MONO | a | b | c | | | ... | | | | | | a | b | c | | | | | | | | | | | | | | | | | | | | ... | | | | |
| 7 SYNC | a | b | c | | | ... | | | | | | | | | | | | | | | | | | | | | | | | | | | | ... | | | | |
| 8 REF | a | b | c | | | ... | | | | | | | | | | | a | b | c | 0 | 0 | 1 | 0 | 1 | 0 | 0 | 1 | 0 | 1 | 0 | 0 | 1 | 0 | ... | 1 | 1 | 1 | 0 |
| 9 "1" | a | b | c | | | ... | | | a | b | c | | | | | | 0 | 1 | 1 | 0 | 0 | 1 | 1 | 0 | 1 | 0 | 0 | 1 | 1 | 0 | 1 | 0 | 0 | ... | 1 | 1 | 0 | 0 |
| 10 "0" | a | b | c | | | ... | | | | | | a | b | c | | | 1 | 0 | 1 | 0 | 1 | 0 | 1 | 0 | 1 | 0 | 1 | 0 | 1 | 0 | 1 | 0 | 1 | ... | 1 | 0 | 1 | 0 |
| 11 "1" | a | b | c | | | ... | | | a | b | c | | | | | | 0 | 1 | 1 | 0 | 0 | 1 | 1 | 0 | 1 | 0 | 0 | 1 | 1 | 0 | 1 | 0 | 0 | ... | 1 | 1 | 0 | 0 |
| 12 "0" | a | b | c | | | ... | | | | | | a | b | c | | | 1 | 0 | 1 | 0 | 1 | 0 | 1 | 0 | 1 | 0 | 1 | 0 | 1 | 0 | 1 | 0 | 1 | ... | 1 | 0 | 1 | 0 |
| 13 MONO | a | b | c | | | ... | | | | | | | | | | | 0 | 1 | 1 | 0 | 0 | 1 | 1 | 0 | 1 | 0 | 0 | 1 | 1 | 0 | 1 | 0 | 0 | ... | 1 | 1 | 0 | 0 |
| 14 "1" | a | b | c | | | ... | | | a | b | c | | | | | | 0 | 1 | 1 | 0 | 0 | 1 | 1 | 0 | 1 | 0 | 0 | 1 | 1 | 0 | 1 | 0 | 0 | ... | 1 | 1 | 0 | 0 |
| 15 "0" | a | b | c | | | ... | | | | | | a | b | c | | | 1 | 0 | 1 | 0 | 1 | 0 | 1 | 0 | 1 | 0 | 1 | 0 | 1 | 0 | 1 | 0 | 1 | ... | 1 | 0 | 1 | 0 |
| 16 "1" | a | b | c | | | ... | | | a | b | c | | | | | | 0 | 1 | 1 | 0 | 0 | 1 | 1 | 0 | 1 | 0 | 0 | 1 | 1 | 0 | 1 | 0 | 0 | ... | 1 | 1 | 0 | 0 |
| 17 "0" | a | b | c | | | ... | | | | | | a | b | c | | | 1 | 0 | 1 | 0 | 1 | 0 | 1 | 0 | 1 | 0 | 1 | 0 | 1 | 0 | 1 | 0 | 1 | ... | 1 | 0 | 1 | 0 |
| 18 MONO | a | b | c | | | ... | | | | | | | | | | | 0 | 1 | 1 | 0 | 0 | 1 | 1 | 0 | 1 | 0 | 0 | 1 | 1 | 0 | 1 | 0 | 0 | ... | 1 | 1 | 0 | 0 |
| 19 "1" | a | b | c | | | ... | | | a | b | c | | | | | | 0 | 1 | 1 | 0 | 0 | 1 | 1 | 0 | 1 | 0 | 0 | 1 | 1 | 0 | 1 | 0 | 0 | ... | 1 | 1 | 0 | 0 |
| 20 "0" | a | b | c | | | ... | | | | | | a | b | c | | | 1 | 0 | 1 | 0 | 1 | 0 | 1 | 0 | 1 | 0 | 1 | 0 | 1 | 0 | 1 | 0 | 1 | ... | 1 | 0 | 1 | 0 |
| ... | ... | ... | ... | | | ... | | | ... | ... | ... | ... | ... | ... | | | ... | ... | ... | ... | ... | ... | ... | ... | ... | ... | ... | ... | ... | ... | ... | ... | ... | ... | ... | ... | ... | ... |
| 78 MONO | a | b | c | | | ... | | | | | | | | | | | 0 | 1 | 1 | 0 | 0 | 1 | 1 | 0 | 1 | 0 | 0 | 1 | 1 | 0 | 1 | 0 | 0 | ... | 1 | 1 | 0 | 0 |
| 79 "1" | a | b | c | | | ... | | | a | b | c | | | | | | 0 | 1 | 1 | 0 | 0 | 1 | 1 | 0 | 1 | 0 | 0 | 1 | 1 | 0 | 1 | 0 | 0 | ... | 1 | 1 | 0 | 0 |
| 80 "0" | a | b | c | | | ... | | | | | | a | b | c | | | 1 | 0 | 1 | 0 | 1 | 0 | 1 | 0 | 1 | 0 | 1 | 0 | 1 | 0 | 1 | 0 | 1 | ... | 1 | 0 | 1 | 0 |
| 81 "1" | a | b | c | | | ... | | | a | b | c | | | | | | 0 | 1 | 1 | 0 | 0 | 1 | 1 | 0 | 1 | 0 | 0 | 1 | 1 | 0 | 1 | 0 | 0 | ... | 1 | 1 | 0 | 0 |
| 82 "0" | a | b | c | | | ... | | | | | | a | b | c | | | 1 | 0 | 1 | 0 | 1 | 0 | 1 | 0 | 1 | 0 | 1 | 0 | 1 | 0 | 1 | 0 | 1 | ... | 1 | 0 | 1 | 0 | a: cos1.5w    b: −cos1.0w    c: −cos1.5w    BLANK: cos1.0w
1: SAWTOOTH WAVE REPRESENTING VALUE "1"    0: SAWTOOTH WAVE REPRESENTING VALUE "0"

OPTICAL DISC WITH DIFFERENT WOBBLE PATTERNS IN DIFFERENT GROOVES

TECHNICAL FIELD

The present invention relates in general to the structure of an optical disc, and relates more particularly to an optical disc having wobble grooves.

BACKGROUND ART

A variety of user-recordable optical discs is now available, including DVD-RAM, CD-RW, and mini discs. Recordable optical discs such as these have grooves formed along plural spiral or concentric tracks with a groove surface made from phase change material or magneto-optical material. Addresses identifying specific locations on the disc are also pre-recorded to the tracks using unrewritable marks. As recording density of the disc increases, so does the need for additional address information, and it is therefore essential to provide the address information as efficiently as possible.

Japanese Patent Laid-Open Publication 8-315426 teaches one way to accomplish this by forming patterns corresponding to address signals in non-contiguous areas in the grooves. A "pattern corresponding to an address signal" refers to a binary signal that inverts in each non-contiguous area. These non-contiguous areas are used as signals indicating if information is present or not (yes or no), and therefore cannot be used to efficiently provide address information.

A different addressing method as disclosed in WPO laid-open document WO 01/52250 as a second example of the prior art teaches a technology for providing a wave-like wobble groove on the optical disc and selectively varying the wobble pattern. By encoding two or more meanings, that is, different information, using these wobble variations, address information can be provided more efficiently.

These wobble pattern variations are achieved in the second example by suddenly changing troughs (or peaks) of the groove to peaks (or troughs). The greater the difference in the slope between where there is a sudden change and where there is a gradual change in wobble pattern, the larger information component and the easier detection is during data playback. However, a laser polarizer with a relatively wide frequency band is required to manufacture optical discs having grooves with such sudden changes in the wobble pattern.

DISCLOSURE OF INVENTION

It is an object of the present invention to improve S/N ratio so that as much information as possible can be recorded at the lowest possible frequency band when recording data to an optical disc.

To achieve this object, an optical disc using wobble patterns to record different information according to the present invention has a first groove with a first wobble pattern in which one wobble period has a sharp rising edge and a gradual falling edge, and a second groove having a second wobble pattern in which one wobble period has a gradual rising edge and a sharp falling edge. The first wobble pattern is represented by the first fundamental and second harmonic of a Fourier series, and the second wobble pattern is represented by the first fundamental and second harmonic of a Fourier series where the polarity of this second harmonic, which is an even harmonic, is opposite the polarity of the second harmonic of the first wobble pattern, thereby achieving the object of the invention.

According to the present invention, a wobble from a waveform including a first fundamental and harmonics to the n-th harmonic (where n is a finite integer of 2 or more) is formed when recording information according to wobble patterns in the grooves of the optical disc. The present invention can therefore easily form a wobble pattern in a finite, relatively low frequency band while recording much information, and thereby also improve the S/N ratio.

Preferably, the first wobble pattern is further represented by the third harmonic and fourth harmonic of a Fourier series, and the second wobble pattern is further represented by the third harmonic and fourth harmonic of a Fourier series where the polarity of the second and fourth harmonics, which are both even harmonics, are opposite those of the second and the fourth harmonics of the first wobble pattern.

Yet further preferably, the first wobble pattern is further represented by using harmonics to an n-th harmonic (where n is a finite even number) of a Fourier series, and the second wobble pattern is further represented by using harmonics to an n-th harmonic (where n is a finite even number) of a Fourier series where the polarity of the even harmonics of the second wobble pattern are opposite the polarity of the even harmonics of the first wobble pattern.

Yet further preferably, the ratio of a second coefficient of the second harmonic to a first coefficient of the first fundamental is in the range from −13.5 dB to −10 dB. Yet further preferably, the ratio is in the range from −13.5 dB to −12 dB.

According to the present invention, the optical disc contains: data sub-blocks which include address data of physical addresses of the optical disc as the different information; and a reference sub-block which includes one of the first wobble pattern and the second wobble pattern to be used as a reference for demodulating waveforms of the address data in the data sub-blocks.

A method for manufacturing an optical disc using wobble patterns to record different information according to the present invention has a step for forming a first groove having a first wobble pattern in which one wobble period has a sharp rising edge and a gradual falling edge producing a first fundamental and second harmonic of a Fourier series; and a step for forming a second groove having a second wobble pattern in which one wobble period has a gradual rising edge and a sharp falling edge producing a first fundamental and second harmonic of a Fourier series such that the polarity of this second harmonic, which is an even harmonic, is opposite the polarity of the second harmonic of the first wobble pattern.

Preferably, the step for forming the first groove further forms the first wobble pattern using the third harmonic and fourth harmonic of a Fourier series, and the step for forming a second groove further forms the second wobble pattern using the third harmonic and fourth harmonic of a Fourier series such that the polarity of this second harmonic and the polarity of the fourth harmonic, which are both even harmonics, are opposite the polarity of the second harmonic and fourth harmonic of the first wobble pattern.

Yet further preferably, the step for forming the first groove further forms the first wobble pattern using harmonics to the n-th harmonic (where n is a finite even number) of a Fourier series, and the step for forming a second groove further forms the second wobble pattern using harmonics to the n-th harmonic (where n is a finite even number) of a Fourier series such that the polarity of the even harmonics of the second wobble pattern are opposite the polarity of the even harmonics of the first wobble pattern.

Yet further preferably, the ratio of the second coefficient of the second harmonic to the first coefficient of the first fundamental is in the range from −13.5 dB to −10 dB. Even further preferably, the ratio is in the range from −13.5 dB to −12 dB.

BRIEF DESCRIPTION OF DRAWINGS

The above and other objects and features of the present invention will become clear from the subsequent description of a preferred embodiment thereof made with reference to the accompanying drawings, in which like parts are designated by like reference numerals and in which:

FIG. 3A is a diagram of a wobble pattern for a "1" pattern.

FIG. 3B is a diagram of a wobble pattern for a "0" pattern;

FIG. 4 is a diagram of a waveform where coefficient $H_2$ is −15 dB;

FIG. 12 is a diagram of an example of an address format; and

BEST MODE FOR CARRYING OUT THE INVENTION

A preferred embodiment of the present invention is described below with reference to the accompanying figures.

Figure 1:
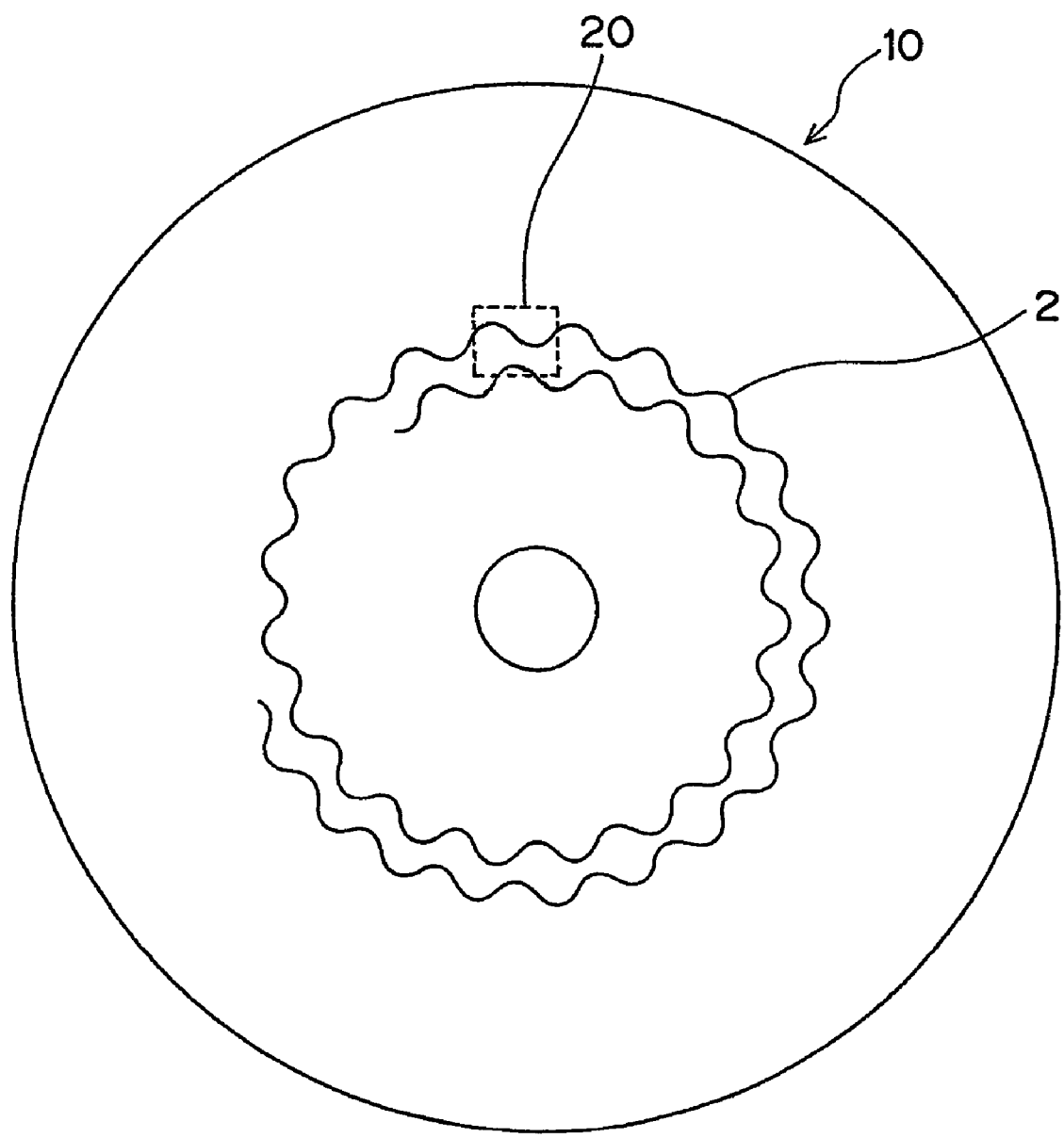
FIG. 1 is a schematic view of an optical disc according to the present invention.

FIG. 1 is a schematic view of an optical disc 10 according to the present invention. Optical disc 10 has plural spiral or concentric tracks 2. In FIG. 1, optical disc 10 with spiral tracks is shown. It will be noted that while the tracks 2 are shown with an extremely large track pitch in FIG. 1, the actual track pitch is, for example, 0.32 μm. Each track 2 is divided into a plurality of sectors, which are used as the data recording and playback unit.

Tracks 2 are defined as grooves formed in optical disc 10 surface. A space between two adjacent track 2 (grooves) is called a land. As will be obvious from FIG. 1, each groove is formed with a wave pattern referred to as a wobble pattern. The present invention uses different wobble patterns to record sector addresses, which are physical addresses used to locate a particular location on optical disc 10.

Figure 2:
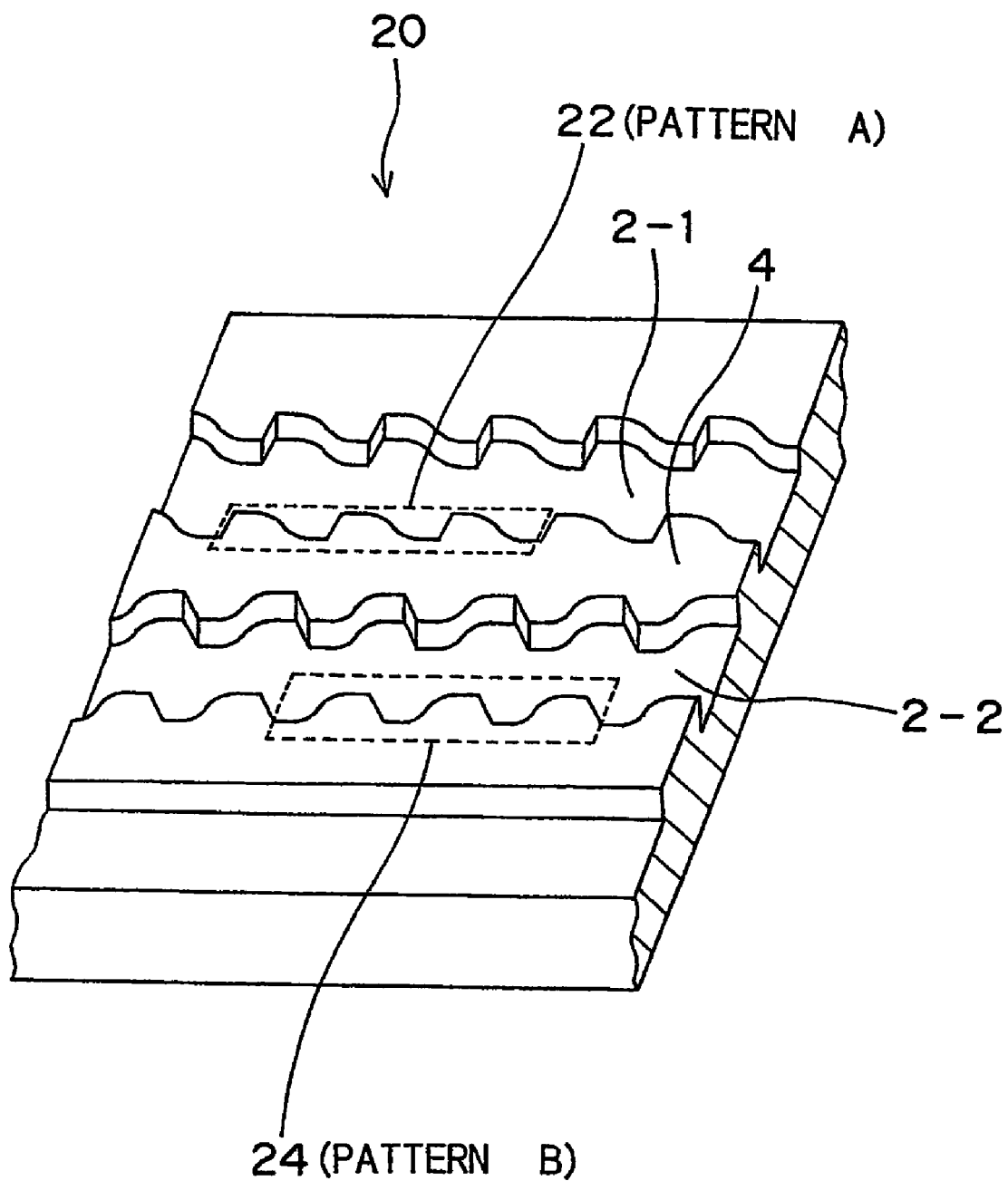
FIG. 2 is an enlarged view of an area containing a wobble pattern.

These wobble patterns are described more specifically below with reference to one part of track 2 shown in area 20 in FIG. 1. FIG. 2 is an enlarged view of area 20 containing wobble patterns 22 and 24. As will be known from FIG. 2, a land 4 separates track 2-1 and track 2-2. As will be understood from the figure, the wobble patterns are a sawtooth pattern with a same phase and substantially the same groove width on both sides of a track, that is, grooves 2-1 and 2-2. In other words, the valleys and peaks of the pattern on one side of the groove are formed opposite the peaks and valleys of the pattern on the other side of the groove. The patterns are formed by exposure with a laser oscillating perpendicularly to the track, and patterns with synchronized valleys and peaks can therefore be easily formed on both sides of the grooves. It will be noted that the wobble pattern could be formed on only one side the grooves instead of on both sides.

Reading from left to right as seen in FIG. 2, the sawtooth wobble patterns include wobble pattern 22 (pattern A) having a relatively sharp rising edge and a relatively gradual falling edge, and wobble pattern 24 (pattern B) having a relatively gradual rising edge and a relatively sharp falling edge. The present invention reads pattern A as a "1" value and pattern B as a "0" value. A bit value of 1 can be recorded by forming 37 consecutive A patterns, and a bit value of 0 can be recorded by forming 37 consecutive B patterns, for example. The patterns are formed consecutively in order to improve S/N ratio when reading. Addresses consisting of dozens of bits (60 bits, for example) can be recorded by forming plural sets of consecutive patterns A or B separated by a specific divider. This specific divider could be, for example, a wobble pattern (not shown in the figure) formed with a locally inverted phase. It is thus possible to address the optical disc using a physical wobble structure preformed on the disc to record disc address information.

A feature of the present invention is to form the wobble patterns of patterns A and B in a low frequency band on the optical disc.

Pattern A representing a 1 value (referred to below as "pattern 1") and pattern B representing a 0 value (referred to below as "pattern 0") are further described below with reference to FIG. 3. FIG. 3A shows the wobble pattern for pattern 1, and FIG. 3B shows the wobble pattern for pattern 0.

The wobble patterns for patterns 1 and 0 can be mathematically expressed. As shown in FIG. 3A, wobble pattern 1 can be denoted as time function $f_1(t)$ where the direction of disc rotation is the direction of the time base. As shown in FIG. 3, an angle of the slope at the rising edge of time function $f_1(t)$ is substantially 90 degrees but the slope of the falling edge is more gradual. This time function $f_1(t)$ can be written as a Fourier series using trigonometric functions. The specific equation of this Fourier series is shown in FIG. 3A where $\sin(w_0 t)$ is the first fundamental and $\sin(nw_0 t)$ is the n-th harmonic. The coefficient of $\sin(nw_0 t)$ is referred to as Fourier series Hn. FIG. 3A shows specific examples of the first fundamental, second, third, and fourth harmonics, and Fourier series $H_1$ to $H_4$.

Wobble pattern 0 can be similarly denoted as time function $f_2(t)$ where the direction of disc rotation is the direction of the time base as shown in FIG. 3B. In this case an angle of the slope at the falling edge is substantially 90 degrees in time function $f_2(t)$, and the slope of the rising edge is relatively gradual. This time function $f_2(t)$ can also be written as a Fourier series using trigonometric functions. The specific equation of this Fourier series is shown in FIG. 3B where the first fundamental and n-th harmonics are defined as noted above. FIG. 3A shows specific examples of the first fundamental, second, third, and fourth harmonics, and Fourier series $H_1$ to $H_4$.

It is important to note here that the odd-numbered Fourier series of time functions $f_1(t)$ and $f_2(t)$ are equal, but the even-numbered Fourier series are opposite sign. This will be obvious from the content of Fourier series Hn and Hn shown in FIGS. 3A and 3B. If the coefficients of the odd waves are the same and the coefficients of the even waves are opposite sign, the positions of the sharp and gradual components of the waves will be interchanged. If the Fourier series Hn of time function $f_1(t)$ for pattern 1 is determined, then the Fourier series Hn of pattern 0 can also be determined, and time function $f_2(t)$ can also be detected.

If the wobble patterns are defined by time functions $f_1(t)$ and $f_2(t)$ determine, then the wobble patterns can be used to encode information. However, a laser polarizer with a wide frequency band is needed to expose and detect these patterns from an actual optical disc, the Fourier series must be checked to extremely high harmonics during the optical disc manufacturing process, and these wobble patterns are therefore impractical.

In order to determine the function of the waveforms formed on the optical disc, it is therefore necessary to determine harmonics of what degree must be used. Considering the effects of harmonic components that are not used (i.e. rounded), one or more coefficient values of the harmonic used can be different from those of the Fourier series. It is also necessary to determine how large of a coefficient is needed to generate a waveform usable for encoding information. It will also be obvious that when considering to what degree of harmonics to use, the circuits and mechanisms used to generate the harmonics should be as few as possible. It is therefore also not practical to consider very many harmonics.

The present invention is therefore described with reference to an example in which the first fundamental and the second harmonic are used, and a further example using the first fundamental and second to fourth harmonics. We then describe the range of harmonic coefficients needed to encode information in the waveform. It should be noted that it is possible to use up to the sixth harmonic or even harmonics to the eighth or higher degree. Using more harmonics makes it possible to achieve a waveform with even more sudden changes, and what harmonic is used is therefore preferably chosen to achieve the waveform with the desired characteristics. A Fourier series is generally written using trigonometry functions, and sine or cosine functions can therefore be used. In the following description the first fundamental is denoted as cos(wt) and the n-th harmonic as sin(nwt). When a coefficient different from the Fourier series is used, the coefficient of the n-th harmonic is denoted as Hn. In general, $$f = H_1 \cos(wt) + \in Hn \sin(nwt)$$

That is, function f is sum of the first fundamental and all harmonics to the n-th harmonic (where n is a finite integer of 2 or more).

FIGS. 4 to 8 show examples of waveforms generated using the first fundamental and the second harmonic. Each figure shows three periods of each wave. The horizontal axis shows phase. The waves have a period of $2\pi$. The coefficient $H_2$ of the second harmonic is denoted in decibels as a ratio to the coefficient $H_1$ of the first fundamental. As will be known by comparing the two functions in the first and second rows in FIG. 4, the sign of the coefficient $H_2$ of the second harmonic is opposite in the two functions. If the sign of the coefficient $H_2$ of the second harmonic is opposite, the rise and fall of the two waveforms will also be different. The present invention assigns a value of 1 to the wave in which the coefficient $H_2$ is positive, and a value of 0 to the wave in which coefficient $H_2$ is negative.

FIG. 4 shows a waveform where coefficient $H_2$ is −15 dB. Because coefficient $H_2$ is small relative to coefficient $H_1$, the pattern of the first fundamental is primarily seen. Waveforms $f_{41}$ and $f_{42}$ representing different information are not significantly different but can be differentiated and the difference detected. While the information encoded in the wave can be detected, a higher coefficient (dB value) is preferable for easier detection.

Figure 5:
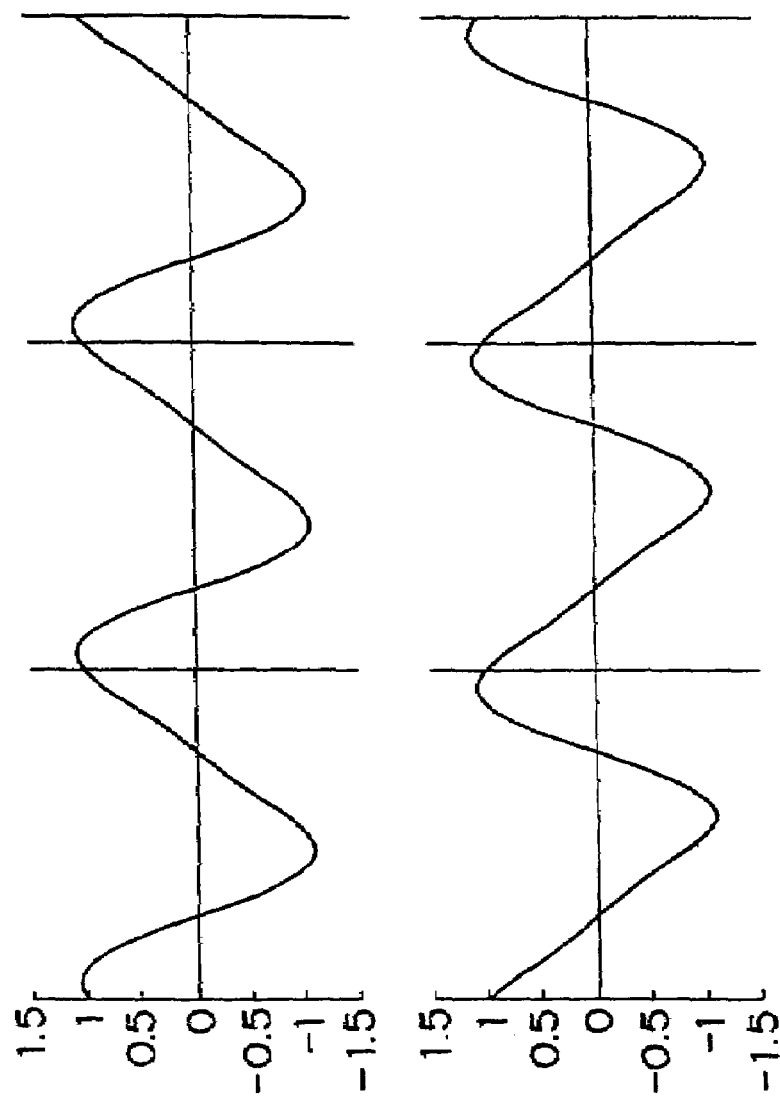
FIG. 5 is a diagram of a waveform where coefficient $H_2$ is −13.5 dB.

FIG. 5 shows a waveform where coefficient $H_2$ is −13.5 dB. As the decibel level increases, coefficient $H_2$ becomes closer to coefficient $H_1$. The effect of the second harmonic thus appears in the first fundamental waveform. The waveform of the second harmonic with a gradual slope begins to appear in the waveform of the first fundamental. As the amplitude of the second harmonic increases, the amplitude of the combined wave also increases, and it becomes easier to detect the wave formed on the optical disc. At the same time, however, waveform distortion also increases, and detection becomes more difficult. In the example shown in FIG. 5 there is a slight increase in amplitude and substantially no waveform distortion. The differences in the waveforms for encoding different information can also be sufficiently recognized. Information can therefore be imparted to the waveforms.

Figure 6:
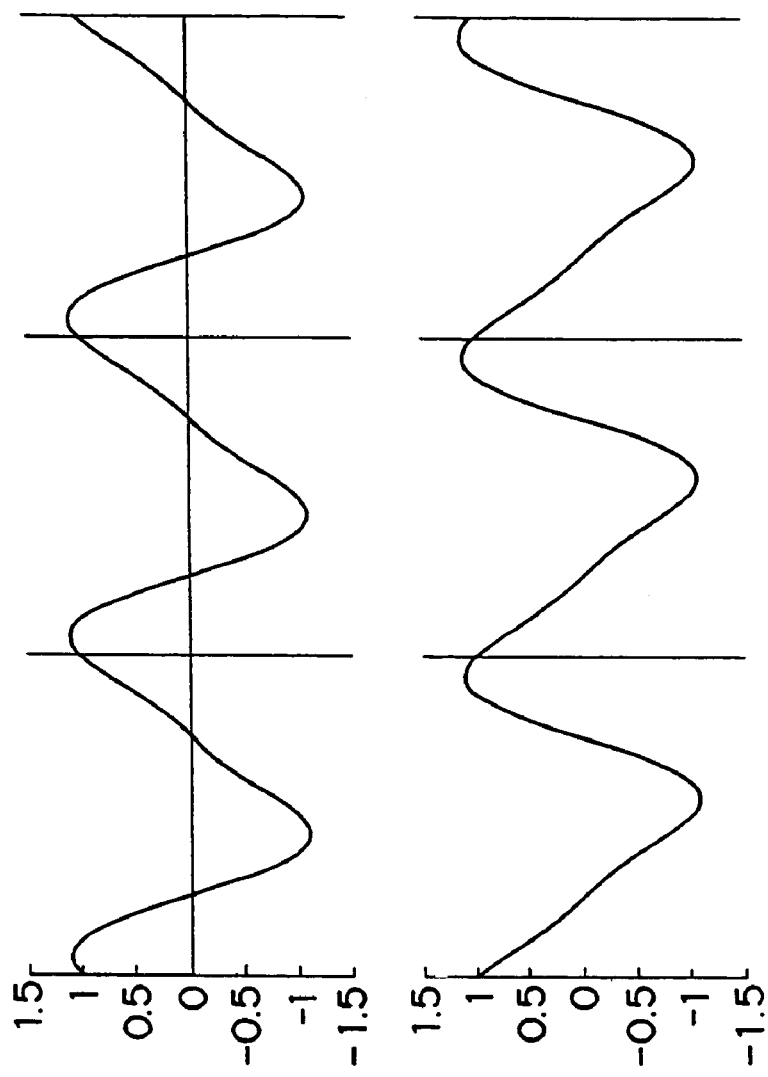
FIG. 6 is a diagram of a waveform where coefficient $H_2$ is −12 dB.
Figure 7:
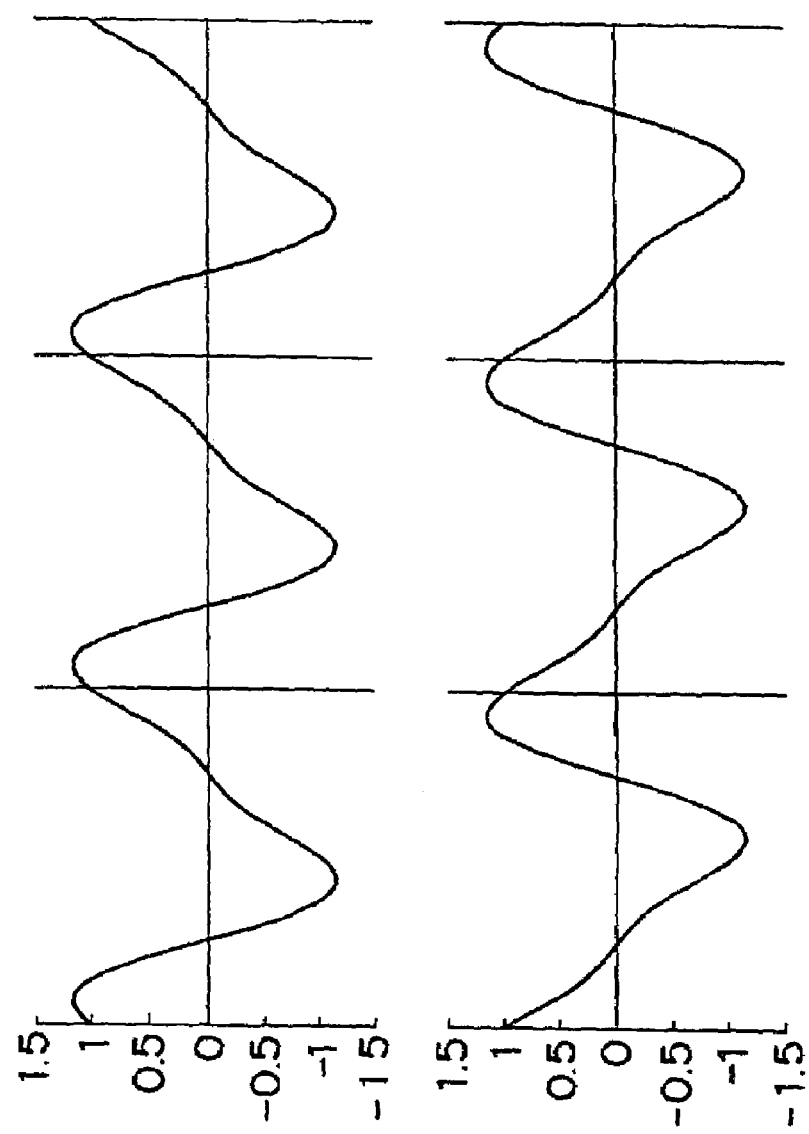
FIG. 7 is a diagram of a waveform where coefficient $H_2$ is −10 dB.

FIG. 6 shows a waveform with a coefficient $H_2$ of −12 dB, and FIG. 7 shows an example where the coefficient $H_2$ is −10 dB. In each of these cases waveform distortion is not a problem, differentiating the sharp slope and gradual slope in each wave is easy, and the waveforms are different enough to encode different information. The waves can therefore be used to encode information.

Figure 8:
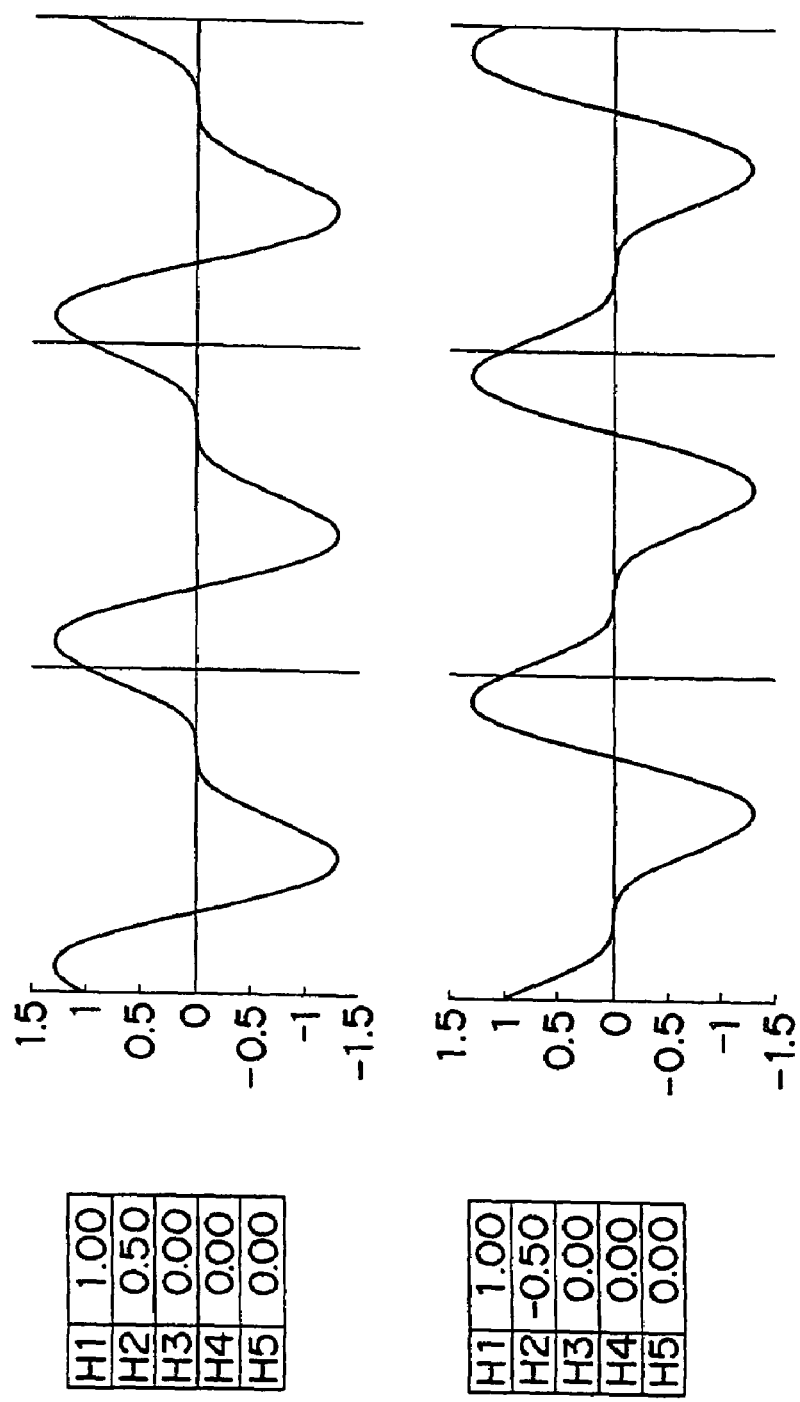
FIG. 8 is a diagram of a waveform where coefficient $H_2$ is −6 dB.

FIG. 8 shows a waveform with a coefficient $H_2$ of −6 dB. Distortion is pronounced but detection is still possible. It should be noted that if coefficient $H_2$ is 0 dB, that is, if $H_1=H_2$, waveform distortion is even more pronounced but detection is still possible.

These examples show that a coefficient $H_2$ of −6 dB or less, that is, $H_2/H_1 < \frac{1}{2}$, is preferable with respect to waveform detection. Further preferably, coefficient $H_2$ is in the range from −13.5 dB to −10 dB. Even more preferably, coefficient $H_2$ is in the range from −13.5 dB to −12 dB. Within this range waveform amplitude is sufficiently high, distortion is sufficiently low, and waveform differences are sufficiently detectable. Address information can therefore be encoded using a wobble pattern on the optical disc.

Figure 9:
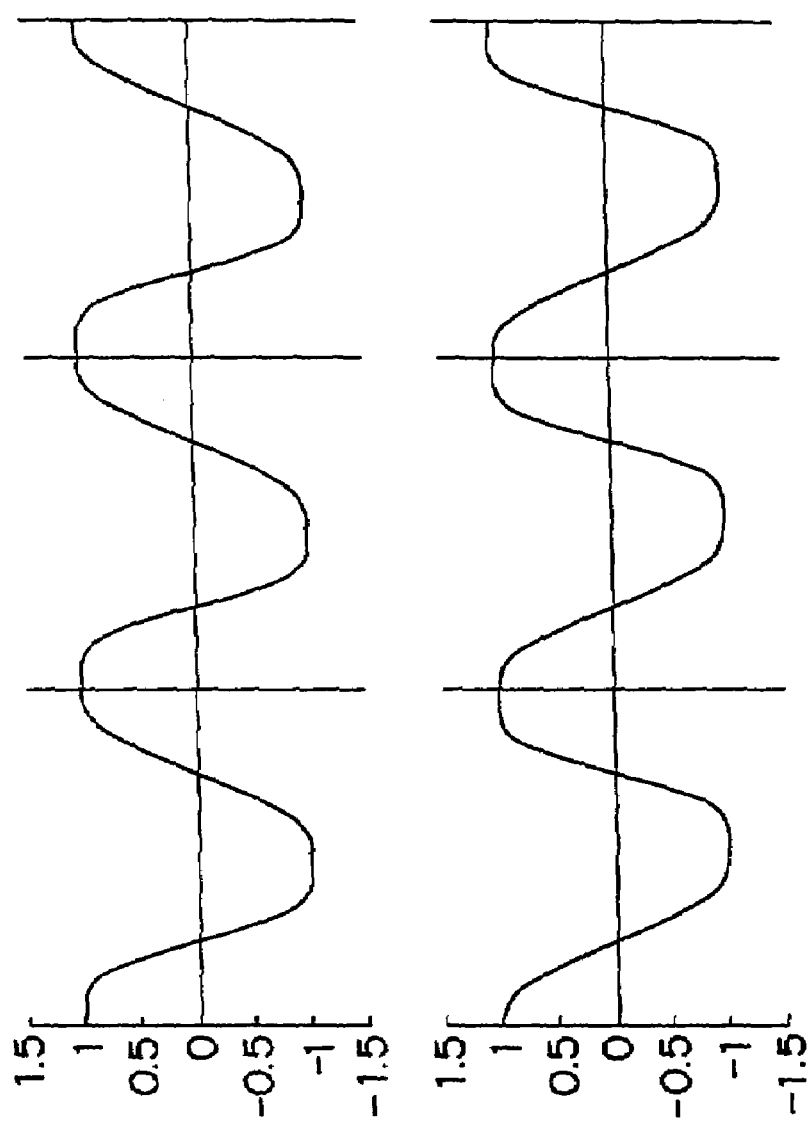
FIG. 9 is a diagram of a first waveform generated from a first fundamental and 2nd to 4th harmonics.
Figure 10:
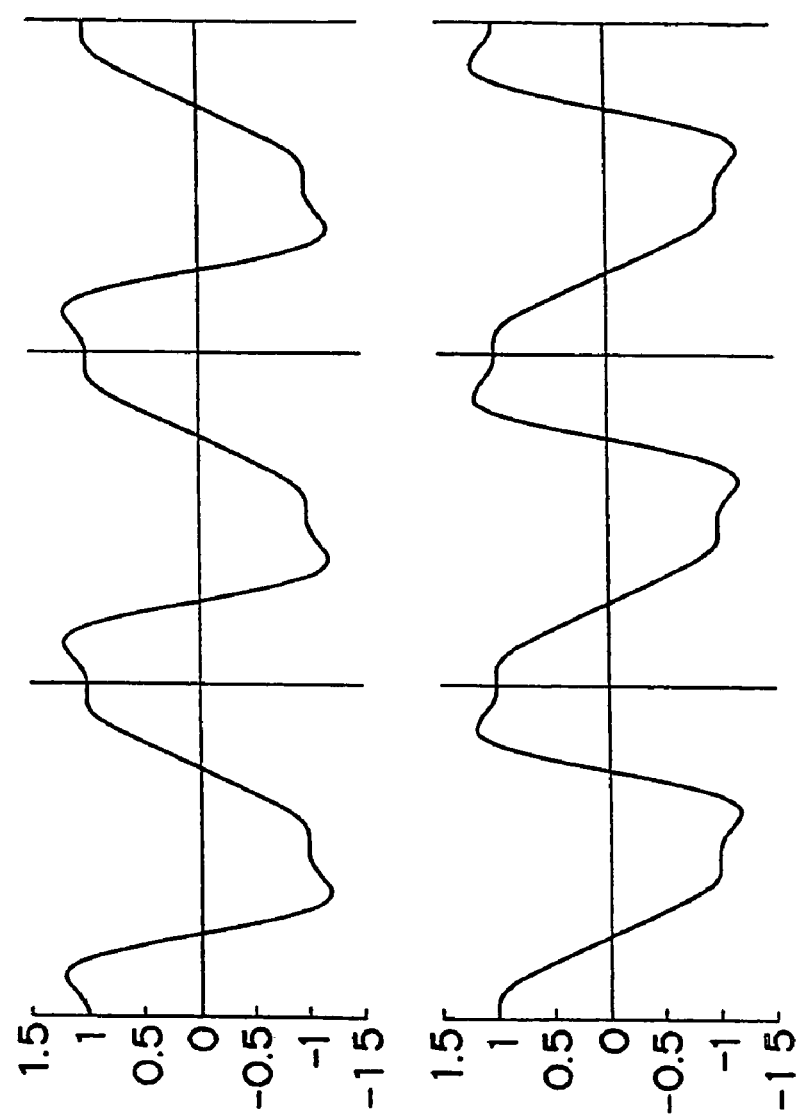
FIG. 10 is a diagram of a second waveform generated from a first fundamental and 2nd to 4th harmonics.

A waveform of the first type generated from the first fundamental and the second to fourth harmonics is shown next in FIG. 9, and a waveform of the second type generated from the first fundamental and the second to fourth harmonics is shown next in FIG. 10. The first type uses to the fourth harmonic to emphasize waveform smoothness. The second type uses to the fourth harmonic to emphasize a sharp rising edge and a falling edge. A desired pattern can be achieved by adjusting the coefficient Hn of the n-th harmonic.

Figure 11:
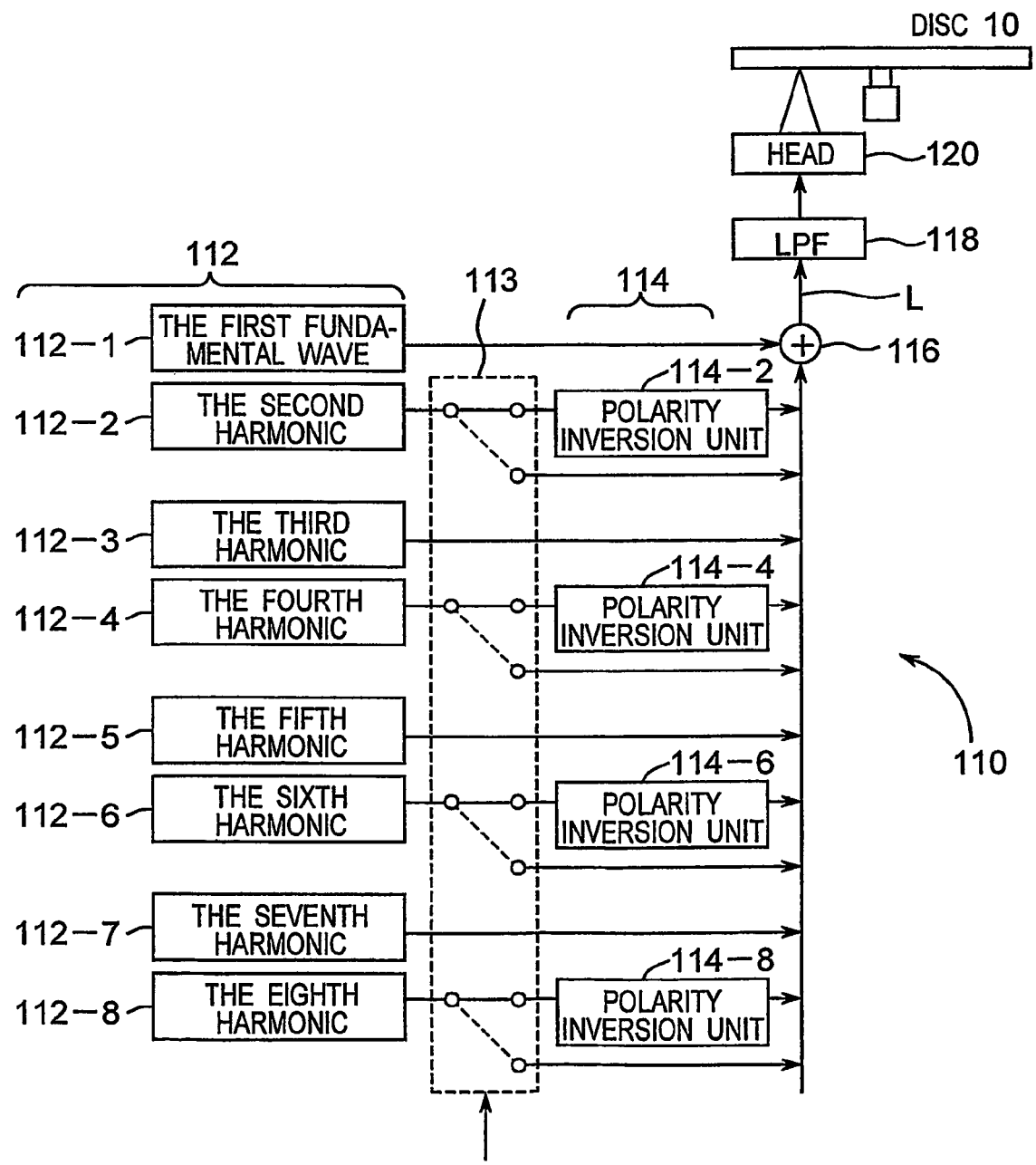
FIG. 11 is a schematic diagram of an optical disc manufacturing apparatus for manufacturing optical discs with a wobble groove.

FIG. 11 is a schematic diagram of an optical disc manufacturing apparatus 110 which manufactures an optical disc with a wobble groove. Optical disc manufacturing apparatus 110 has a waveform generator 112, switches 113, polarity inversion units 114, adder 116, a low-pass filter 118, and an optical head 120.

Waveform generator 112 has a first fundamental wave generating unit 112-1 which generate the first fundamental wave, and second to n-th harmonic generating unit 112-n which generate the second to n-th harmonics (where n is an integer of 2 or more). In the example shown in FIG. 8, n=8.

Each unit 112-n outputs an n-th multiple of the frequency applied thereto. For example, the first fundamental wave generating unit 112-1 generates and outputs the first fundamental, that is, $H_1\cos(wt)$, and the n-th harmonic generating unit 112-n generates $H_n\sin(nwt)$.

The switches 113 are connected to the n-th harmonic generating units 112-n (where n is an even number). The switches 113 switch signal paths according to a bit value, 0 or 1, of the recording data, that is, the address value. In this embodiment of the invention the switches 113 select the signal path through polarity inversion unit 114 for bit 0, and select the signal path connecting directly to the adder 116 for bit 1. Signal path selection is always synchronized.

Polarity inversion units 114 is provided for each n-th harmonic generating unit 112-n (where n is even), and each polarity inversion unit 114 is connected to corresponding switch 113. FIG. 11 shows four polarity inversion units 114-2, 114-4, 114-6, and 114-8. The polarity inversion units 114-2 to 114-8 are respectively connected to the output of the corresponding even harmonic generators 112-2 to 112-8 through switches 113, and invert the polarity of the output harmonic waves. "Invert the polarity" as used here means to reverse the positive and negative signs of the signals. This process is equivalent to making the coefficient of the even harmonics negative. Polarity can be inverted by inverting the positive and negative of the actual waveform, by shifting the phase by half a period, or other method.

Output from the odd harmonic generating units, that is, the first fundamental wave generating unit 112-1, and third, fifth, and seventh harmonic units 112-3, 112-5, and 112-7, output from the even harmonic generating units, and the polarity-inverted even harmonic output from polarity inversion units 114, are input to adder 116. Adder 116 then adds the input signals. This process is also referred to as synthesizing the signals. Output from adder 116 is input to low-pass filter 118 along signal path L. The signal f flowing down path L is expressed as $f=H_1\cos(wt)+H_n\sin(nwt)$. More specifically, if n=2, then $f=H_1\cos(wt)+H_2\sin(2wt)$.

Low-pass filter 118 cuts off extraneous frequency components (noise) at frequencies above the n-th harmonic, and passes a low frequency wave containing frequencies to the n-th harmonic. Output from the low-pass filter 118, that is, signal f, is applied to optical head 120 emitting a laser to optical disc 10. The surface of optical disc 10 is mirror polished and coated with a photoresist. A wobble groove is formed on optical disc 10 by driving optical head 120 orthogonally to the tracks and emitting the laser while spinning optical disc 10. The wobble groove formed by the example shown in FIG. 11 is a relatively low frequency wobble consisting of the first fundamental wave and second to eighth harmonics.

Optical disc 10 according to the present invention is thus manufactured. It should be noted that this optical disc manufacturing apparatus 110 is described using up to the eighth harmonic. It will be obvious that if only the first fundamental and second harmonic are used, then harmonic generators 112-2 to 112-8 and polarity inversion units 114-4, 114-6, and 114-8 can be omitted. Harmonics to what degree are used, and harmonics from what degree are not used, can be determined as desired.

Note, further, that the processes prior to adder 116 can be performed using actual circuits, or the signal f output by the adder can be calculated with a computer so that a circuit is only used to generate signal f. What is important is that signal $f=H_1\cos(wt)+H_n\sin(nwt)$ is passed to signal path L.

Next, how address information can be encoded using different wobble patterns is described specifically below.

FIG. 12 shows an exemplary address format whereby addressable areas are indicated with a 60-bit address number such as "101010 . . . 1010." The address areas are formed along a spiral track on the optical disc.

The numbers 0 to 82 shown down the left side of the table are the numbers of sub-blocks (indicated below as sub-block No. 10, for example) when the address area indicated by one address is divided into 83 sub-blocks. Sub-blocks are recorded sequentially to the disc using a CLV (constant linear velocity) recording method. The numbers 0 to 55 along the top of the table indicate the number of periods (indicated below as wobble No. 10, for example) where one period is one period of the wobble pattern described above. Note that part of the table is omitted to avoid duplication.

One sub-block contains 56 wobbles, that is, wobble Nos. 0 to 55. Wobble Nos. 1 to 3 of each sub-block record a specific wobble pattern indicated by the symbols a, b, c where a indicates the pattern $\cos(1.5w)$, b indicates the pattern $-\cos(1.0w)$, and c indicates the pattern $-\cos(1.5w)$. These are patterns modulated with MSK (minimum shift keying) modulation. Because a specific pattern appears every 56 periods, the disc reader can determine the current read position (wobble number) on the disc. Note that a specific pattern identified by an MSK modulation mark is used for bit synchronization and is therefore also referred to as a "bit sync pattern." Note that the blanks in the FIG. 12 table indicate the carrier signal $\cos(1.0w)$ wobble pattern.

A particular function is pre-assigned to each sub-block. The function of each sub-block is indicated in the column to the right of each sub-block number in FIG. 12. "Mono" indicates a monotone sub-block where no data or address sync signal is present. "Sync" indicates a sync sub-block used to detect an address synchronization signal. "1" indicates a sub-block containing a data value "1", and "0" indicates a value "0". "Ref" indicates a reference sub-block used as a reference for demodulating the particular address data waveform in the data sub-blocks formed thereafter.

As will be known from the figure, the monotone sub-blocks and sync sub-blocks alternate in the first seven sub-blocks, and a reference sub-block is provided only in the eighth sub-block. In addition, a monotone sub-block is inserted after every four data sub-blocks.

The sync sub-blocks are described further next. In addition to the MSK modulated patterns recorded to wobble Nos. 1 to 3, the sync sub-blocks also contain MSK modulated patterns recorded to different wobble numbers according to the sub-block number so that every sync sub-block pattern is unique. For example, in sync sub-block No. 1 the specific wobble patterns indicated by symbols a, b, and c are recorded to wobble Nos. 16 to 18 and 26 to 28. These same wobble patterns are recorded to wobble Nos. 18 to 20 and 28 to 30 in sync sub-block No. 3; to wobble Nos. 20 to 22 and 30 to 32 in sync sub-block No. 5 (not shown in the figure); and to wobble Nos. 22 to 24 and 32 to 34 in sync sub-block No. 7. Detecting these address synchronization signals thus enables address synchronization. The optical disc reader can determine the current read position on disc (that is, sub-block number) by recognizing the location where a particular pattern appears. Bit data can be detected and address decoding is possible using the address synchronization signal and the wobble wave signal based on the pattern written to the reference sub-block (further described below).

The data sub-blocks (0 or 1) are described next. A value of 0 or 1 is written to each data sub-block using the MSK modulated wobble pattern and a sawtooth wobble pattern defined by $f=H_1\cos(wt)+\Sigma H_n\sin(nwt)$ (where n is a finite integer of 2 or more). As described above, this sawtooth wobble pattern is formed using a coefficient Hn in a range enabling the address information to be sufficiently expressed.

The data sub-blocks are described more specifically below. The MSK modulated patterns identify a 0 or 1 value according to the wobble No. where the patterns are formed. Shapes of the sawtooth patterns indicates a 0 or 1. More specifically, the MSK modulated patterns a, b, c are formed at wobble Nos. 12 to 14, and the "1" sawtooth pattern (FIG. 3A) is formed at wobble Nos. 18 to 54, in a "1" data sub-block. In a "0" data sub-block, MSK modulated patterns a, b, c are formed at wobble Nos. 14 to 16, and the "0" sawtooth pattern (FIG. 3B) is formed at wobble Nos. 18 to 54. The optical disc reader can therefore detect the bit data recorded to a data sub-block using the MSK modulated pattern or the sawtooth wobble pattern. By expressing the same information in the above two different ways, the information can be read using one method if the other method fails, and reading is more reliable. Read errors are thus very few, and read precision can be improved.

The reference sub-block (Ref) is described next. The reference sub-block is, more accurately, used to correct phase offset of an even carrier in the wobble pattern formed at wobble Nos. 18 to 54 in the data sub-blocks. In this preferred embodiment a 0 wobble pattern is written to wobble Nos. 14 to 54 in the reference sub-block, but a 1 wobble pattern could be used. The reason why a reference sub-block is used is described next below.

As noted above the sub-blocks are recorded with CLV recording scheme, and a phase relationship of the wobble waveforms on two adjacent tracks where data sub-blocks are formed is therefore not constant. The wobble waves are therefore subject to constantly changing phase interference as a result of crosstalk between adjacent tracks. The first fundamental wave (carrier component) and even harmonics (even carrier components) of a sawtooth wave having an even harmonic superimposed on the carrier wobble are affected differently by phase interference, and phase offset occurs between the first fundamental wave and even harmonics. The present invention detects address information synchronized to the clock signal generated from the carrier component. The optical disc reader determines the address information by detecting the phase inversion of the even harmonic signals included according to the address information using frequency-multiplied wave detection of the even harmonic carrier signal generated from the clock signal. If the phase of the even harmonic signal is offset due to crosstalk from adjacent tracks, it may not be possible to accurately detect the phase inversion.

The present invention therefore provides a reference sub-block (Ref), and uses this reference sub-block (Ref) to pre-detect phase shift due to crosstalk. The detected phase shift is used for compensation when detecting phase inversion of the even harmonic components. More specifically, the phase difference between the even harmonic extracted from a specific pattern (such as a pattern having an even harmonic added with a phase relationship equivalent to bit 0) and an even carrier signal of the same frequency synchronized to the carrier wobble is detected using a phase comparator such as in a PLL (phase locked loop). The phase of the even carrier signal is then corrected according to this detected phase difference. Phase offset resulting from crosstalk from adjacent tracks can thus be cancelled.

Figure 13:
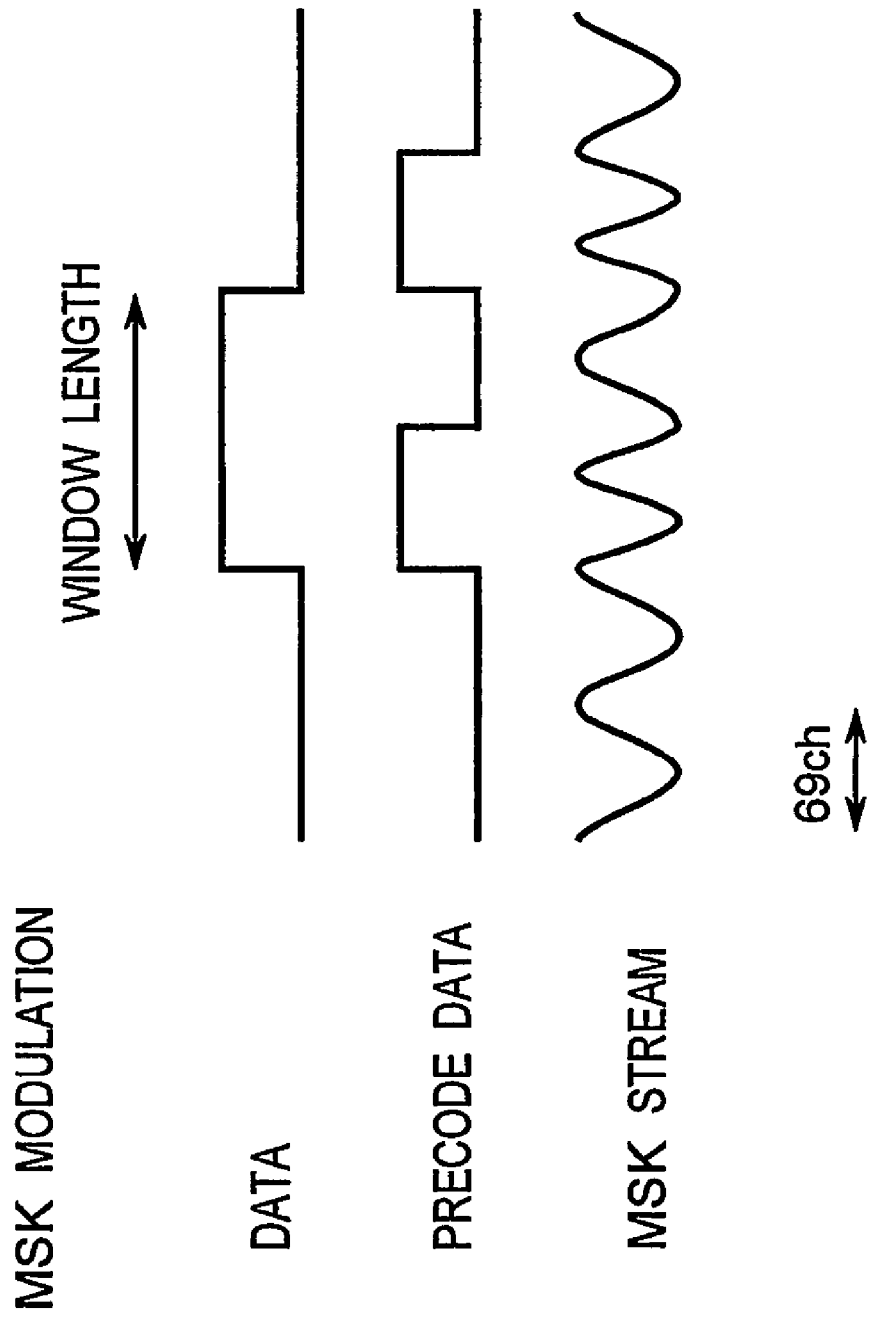
FIG. 13 is a diagram used to describe MSK modulation.

MSK modulation is described next. FIG. 13 is used to describe MSK modulation. The "data" wave in FIG. 13 indicates a "1" value with the high level period equal to two wobble periods. This data value is then differentially coded and converted to a precode data. The precode data expresses "1" between the rising edge and the falling edge of one wobble period. The precode data is then MSK modulated to produce an MSK stream. The MSK stream contains a carrier signal cos1.0 w (or −cos1.0 w) (that is, pattern b in FIG. 12) when the precode data is 0, and a signal 1.5 times the frequency of the carrier signal (cos1.5 w (or −cos1.5 w)) (that is, pattern a, and c in FIG. 12 ) when the precode data is "1". If the channel length of a read/write channel is 1ch, the carrier signal period is 69ch as shown in FIG. 13. The resulting MSK stream is recorded to a specific wobble number position, and detected according to the position as a synchronization signal or a 0 or 1 signal.

It should be noted that wobble is described above with reference to a sawtooth signal, but it will be obvious that the invention shall not be so limited. Any waveform able to encode information can be used.

The invention has also been described forming a wobble signal in the recessed grooves of the disc, but it will also be obvious that the invention is also applicable to disc types in which the grooves are non-recessed, and will achieve the same benefits described above.

The invention claimed is:

1. An optical disc using wobble patterns to record different information, comprising:
   a first groove having a first wobble pattern in which one wobble period has a sharp rising edge and a gradual falling edge;
   a second groove having a second wobble pattern in which one wobble period has a gradual rising edge and a sharp falling edge;
   wherein the first wobble pattern is represented by a first fundamental and a second harmonic of a Fourier series; and
   wherein the second wobble pattern is represented by a first fundamental and a second harmonic of a Fourier series, the polarity of the second harmonic, which is an even harmonic, being opposite the polarity of the second harmonic of the first wobble pattern.

2. An optical disc according to claim 1,
   wherein the first wobble pattern is further represented by a third harmonic and a fourth harmonic of a Fourier series; and
   wherein the second wobble pattern is further represented by a third harmonic and a fourth harmonic of a Fourier series, where the polarity of the second harmonic and the polarity of the fourth harmonic, which are both even harmonics, are opposite the polarity of the second harmonic and the fourth harmonic of the first wobble pattern.

3. An optical disc according to claim 1, wherein the first wobble pattern is further represented by using harmonics to an n-th harmonic, where n is a finite even number, of a Fourier series; and
   wherein the second wobble pattern is further represented by using harmonics to an n-th harmonic, where n is a finite even number, of a Fourier series where the polarity of the even harmonics of the second wobble pattern are opposite those of the even harmonics of the first wobble pattern.

4. An optical disc according to claim 1, wherein a ratio of a second coefficient of the second harmonic to a first coefficient of the first fundamental ranges from −13.5 dB to −10 dB.

5. An optical disc according to claim 4, wherein said ratio further ranges from −13.5 dB to −12 dB.

6. An optical disc according to claim 1, comprising:
data sub-blocks which include address data of physical addresses of the optical disc as the different information; and
a reference sub-block which includes one of the first wobble pattern and the second wobble pattern to be used as a reference for demodulating waveforms of the address data in the data sub-blocks.

7. A method for manufacturing an optical disc using wobble patterns to record different information, comprising steps of:
forming a first groove having a first wobble pattern represented by a first fundamental and second harmonic of a Fourier series, in which one wobble period has a sharp rising edge and a gradual falling edge; and
forming a second groove having a second wobble pattern represented by a first fundamental and second harmonic of a Fourier series, in which one wobble period has a gradual rising edge and a sharp falling edge such that the polarity of the second harmonic, which is an even harmonic, is opposite the polarity of the second harmonic of the first wobble pattern.

8. A method for manufacturing an optical disc according to claim 7, wherein the step of forming the first groove further forms the first wobble pattern using a third harmonic and a fourth harmonic of a Fourier series; and
wherein the step of forming the second groove further forms the second wobble pattern using a third harmonic and a fourth harmonic of a Fourier series such that the polarity of the second harmonic and the polarity of the fourth harmonic, which are both even harmonics, are opposite the polarity of the second harmonic and the fourth harmonic of the first wobble pattern.

9. A method for manufacturing an optical disc according to claim 7, wherein the step of forming the first groove further forms the first wobble pattern using harmonics to an n-th harmonic (where n is a finite even number) of a Fourier series; and
wherein the step of forming the second groove further forms the second wobble pattern using harmonics to the n-th harmonic (where n is a finite even number) of a Fourier series such that the polarity of the even harmonics of the second wobble pattern are opposite the polarity of the even harmonics of the first wobble pattern.

10. A method for manufacturing an optical disc according to claim 7, wherein a ratio of a second coefficient of the second harmonic to a first coefficient of the first fundamental ranges from −13.5 dB to −10 dB.

11. A method for manufacturing an optical disc according to claim 10, wherein said ratio further ranges from −13.5 dB to −12 dB.

* * * * *